(12) United States Patent
Makabe et al.

(10) Patent No.: US 7,543,846 B2
(45) Date of Patent: Jun. 9, 2009

(54) AIR BAG DEVICE

(75) Inventors: Takumi Makabe, Saitama (JP); Toshiya Nagatsuyu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 11/528,319

(22) Filed: Sep. 28, 2006

(65) Prior Publication Data

US 2007/0075528 A1   Apr. 5, 2007

(30) Foreign Application Priority Data

Sep. 30, 2005   (JP) ............................. 2005-287138

(51) Int. Cl.
*B60R 21/16*   (2006.01)
(52) U.S. Cl. ................... 280/730.1; 280/735; 340/432; 340/438; 340/539.1
(58) Field of Classification Search ............. 280/728.1, 280/730.1, 735; 340/425.5, 432, 438, 435, 340/436, 439, 539.21, 539.23, 539.1, 539.15
See application file for complete search history.

(56) References Cited

U.S. PATENT DOCUMENTS

| | | | | |
|---|---|---|---|---|
| 4,023,138 A * | 5/1977 | Ballin | ...................... | 180/287 |
| 4,984,821 A * | 1/1991 | Kim et al. | ................. | 280/728.1 |
| 5,362,098 A * | 11/1994 | Guill | ........................ | 280/733 |
| 5,746,442 A * | 5/1998 | Hoyaukin | ................. | 280/730.1 |
| 5,781,936 A * | 7/1998 | Alaloof | ......................... | 2/456 |
| 6,139,050 A * | 10/2000 | Bultel et al. | .............. | 280/730.1 |
| 6,206,416 B1 * | 3/2001 | Faigle et al. | ................. | 280/735 |
| 6,529,126 B1 * | 3/2003 | Henry | ........................ | 340/467 |
| 6,766,535 B2 * | 7/2004 | Duhamell et al. | ............... | 2/102 |
| 6,783,153 B2 * | 8/2004 | Mattes | ........................ | 280/735 |
| 6,908,103 B2 * | 6/2005 | Umeda et al. | ............. | 280/730.1 |
| 7,017,195 B2 * | 3/2006 | Buckman et al. | ............... | 2/455 |
| 7,038,589 B2 * | 5/2006 | Schmidt et al. | ........... | 340/573.1 |
| 7,380,291 B2 * | 6/2008 | Hashash | ........................ | 2/456 |
| 7,445,235 B2 * | 11/2008 | Makabe et al. | .............. | 280/735 |
| 2003/0231113 A1 * | 12/2003 | Yang et al. | ............... | 340/572.1 |
| 2005/0067816 A1 * | 3/2005 | Buckman | .................. | 280/730.1 |
| 2006/0012471 A1 * | 1/2006 | Ross et al. | ................... | 340/479 |
| 2006/0124376 A1 * | 6/2006 | Goto et al. | ................... | 180/271 |
| 2006/0125206 A1 * | 6/2006 | Goto et al. | .................. | 280/290 |

FOREIGN PATENT DOCUMENTS

| JP | 2002-020907 A | 1/2002 |
|---|---|---|
| JP | 2002-285408 A | 10/2002 |

* cited by examiner

*Primary Examiner*—John Q. Nguyen
*Assistant Examiner*—Nicole Verley
(74) *Attorney, Agent, or Firm*—Birch, Stewart, Kolasch & Birch, LLP

(57) ABSTRACT

An air bag, a control device and a rider or operator removal detecting part are disposed in an operator's jacket. An air bag device body includes air inflating chambers, an ECU, a battery, a radio receiver, a main switch and a warning device incorporated into the jacket. In response to a synchronizing signal transmitted from a vehicle-body-side radio transmitter, a vehicle-body-side electric wave signal generating part and a rider-side reference waveform signal generating part, respectively, generate an electric wave signal and a comparison signal in a synchronized state with a signal comparing part determining a phase difference between both signals. When a delay quantity or a change of the delay quantity of the electric wave signal from the electric wave signal generating part is increased, the ECU detects a removal of a rider for informing an air bag drive part.

20 Claims, 3 Drawing Sheets

AIR BAG DEVICE

CROSS-REFERENCE TO RELATED APPLICATIONS

The present application claims priority under 35 USC 119 to Japanese Patent Application No. 2005-287138 filed on Sep. 30, 2005 the entire contents of which are hereby incorporated by reference.

BACKGROUND OF THE INVENTION

1. Field of the Invention

The present invention relates to an air bag device, and more particularly to an air bag device in which an air bag which attenuates an impact to a rider of a motorcycle or the like is incorporated in the rider's clothing.

2. Description of Background Art

Conventionally, a jacket has been proposed which incorporates an air inflating chamber (air bag) for attenuating an impact to a rider of a motorcycle or the like. For example, JP-A-2002-20907 discloses a jacket provided with an air bag for covering the whole body of a rider. Further, Japanese Utility Model Registration publication 3048094 discloses an automatically inflatable vest which includes two air chambers having volumes that are different from each other for making the two air chambers act as buffers in two stages.

These conventional jackets adopt a structure in which the rider and a vehicle body are connected to each other by a wire. When the rider moves away from the vehicle body with a distance between the rider and the vehicle body exceeding a predetermined value, the air bag is deployed.

Further, JP-A-2002-285408 discloses a system which includes a sensor for detecting a collision which is mounted on a vehicle-body front fork portion, a CPU for determining the necessity of an operation of the air bag device based on the collision detected by the sensor, a device for transmitting an operating signal to a suit, which the rider wears, by radio communication, a receiver which receives the transmitted operating signal, and an ignition circuit which ignites an inflator.

The jacket described in JP-A-2002-20907 is configured such that the device is operated when the distance between the rider and the vehicle body becomes longer than a predetermined quantity. When the rider forgets to remove the wire in a normal dismount operation or when the rider erroneously manipulates the wire during the wire handling manipulation, the wire becomes longer than the predetermined quantity. Thus, there exists a possibility that the air bag device is operated.

Further, in the system which is described in JP-A-2002-285408, an operation signal is outputted after detecting a collision in the longitudinal direction of the vehicle body. Thus, it may take time for detecting the collision. Still further, a sensor which detects the collision must be firmly mounted on a front fork to perform the detection with high accuracy thereby requiring the forming of the vehicle body with accuracy. In addition, and there may arise a situation wherein the mounting of the sensor becomes difficult depending on a type of the vehicle.

SUMMARY AND OBJECTS OF THE INVENTION

It is an object of an embodiment of the present invention to provide an air bag device for making the connection between a vehicle body and a rider using a wire no longer necessary and for performing a more accurate collision detection.

An embodiment of the present invention for solving the above-mentioned problem includes an air bag device incorporating a radio transmitter which is mounted on a vehicle body for transmitting an electric wave signal of a predetermined frequency, a radio receiver which is mounted on a rider's wear for receiving the electric wave signal and a control device which is mounted on the rider's clothing for detecting a delay quantity or a change in the delay quantity of the electric wave signal which is received by the radio receiver. The control device determines the removal of a rider depending on whether the delay quantity or the change of the delay quantity exceeds one of threshold values which correspond to the delay quantity and the change of the delay quantity respectively or not, and operates the air bag mounted on the clothing based on the determination.

Further, an embodiment of the present invention includes the air bag device for incorporating the air bag which is incorporated in a rider's clothing and an inflator which supplies a gas to the air bag so as to deploy the air bag, the air bag device further incorporates a radio receiver which receives an electric wave signal of a predetermined frequency transmitted from a vehicle-body-side radio transmitter, a means for detecting a delay quantity of a reception phase of the electric wave signal or a change quantity of the delay quantity, a control device for generating an instruction to deploy the air bag when the delay quantity or the change quantity of the delay quantity exceeds one of threshold values which are set corresponding to the delay quantity and the change quantity of the delay quantity respectively and a battery for supplying a power source to the radio devices, the control device and the air bag device.

Further, an embodiment of the present invention includes the air bag device that further includes a main switch for supplying the power source to the control device.

Still further, an embodiment of the present invention includes the control device with a map which sets a rider removal determination region as a function of the delay quantity or the change quantity of the delay quantity, and when the delay quantity or the change quantity of the delay quantity falls within a rider's removal region, the control device generates an instruction to develop the air bag.

According to embodiments of the present invention, the electric wave signal of predetermined frequency transmitted from the radio transmitter which is mounted on the vehicle body is received by the radio receiver which is incorporated in the rider's clothing. Thus, a receiving phase of the electric wave signal is determined. When the receiving phase of the electric wave is delayed by exceeding a preset quantity and a change of the delay quantity is increased, it is possible to deploy the air bag.

The inflator, the control device and the battery which deploy the air bag are entirely incorporated in the rider's clothing. Thus, it is possible to eliminate the connection between a vehicle body and a rider and to simplify the system thus enhancing the reliability.

Since the collision determination is performed based on the detection of the removal of the rider, a different from the collision determination using an acceleration sensor or the like, it is possible to easily detect the removal of the rider from the vehicle body even in a state wherein the acceleration in the longitudinal direction of the vehicle body is hardly generated.

According to an embodiment of the present invention, since the region in which the air bag is operated is stored in the map, it is possible to operate the air bag more accurately in a situation which requires the operation of the air bag.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
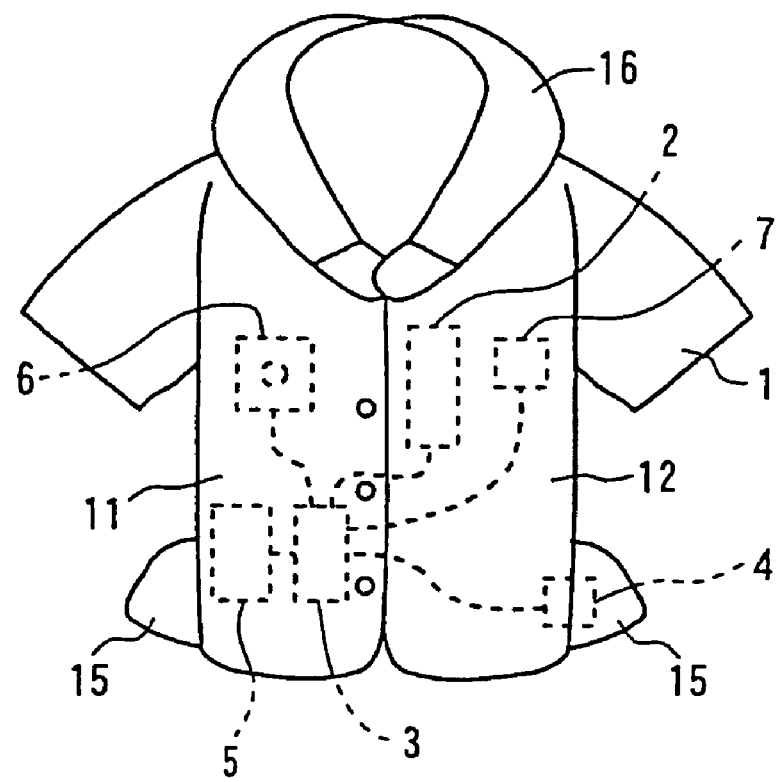
FIG. 1 is a front view of a jacket according to one embodiment of the present invention.
Figure 2:
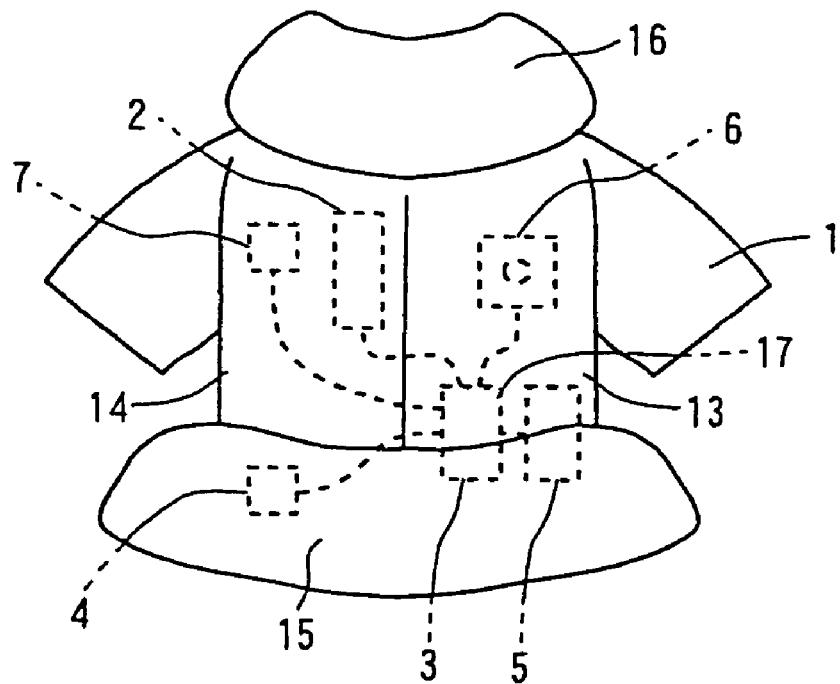
FIG. 2 is a back view of a jacket according to one embodiment of the present invention.
Figure 3:
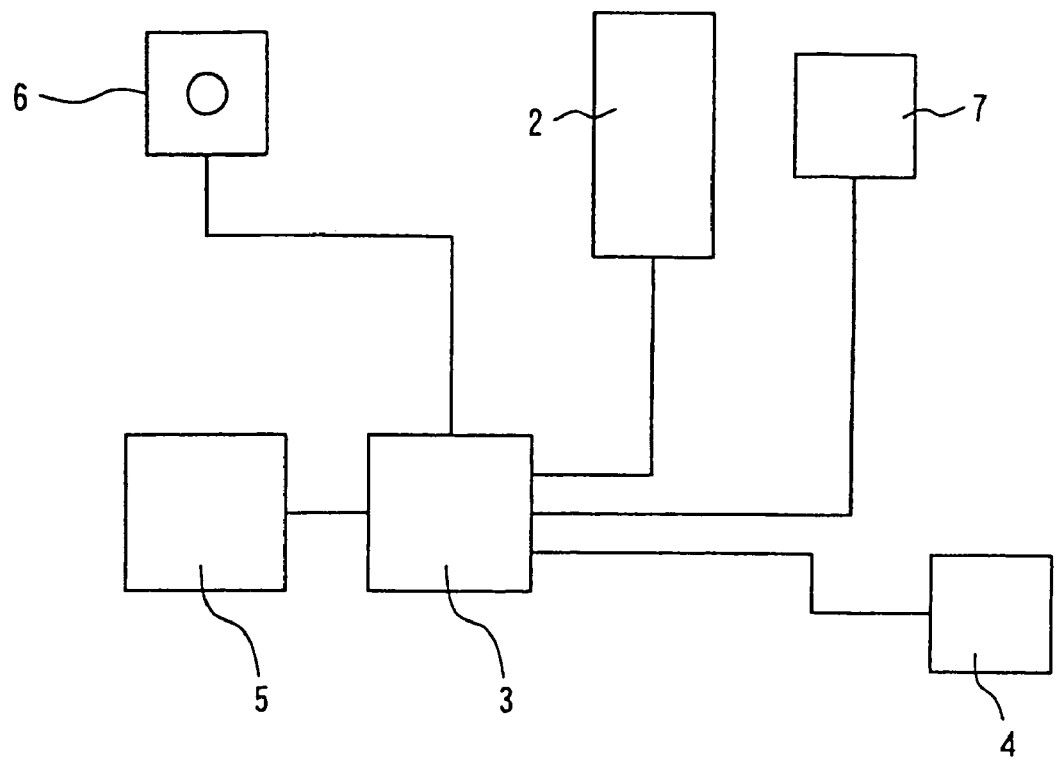
FIG. 3 is a constitutional view of an air bag device body which is removed from the jacket.

As illustrated in FIGS. 1 and 2, a jacket 1 includes an air inflating chamber which is divided into a right front portion 11, a left front portion 12, a right rear portion 13, a left rear portion 14, a waist portion 15 and a collar portion 16. These air inflating chambers are connected to an inflator 2 which supplies a gas for inflation. The inflator 2 for supplying the gas to the respective air inflating chambers when the air bag device is operated, an ECU 3 for controlling the inflator 2, a battery 4 for the ECU 3, a radio receiver 5 which is used for the communication with the motorcycle, and a main switch 6 are mounted on the jacket 1. A warning device 7 for informing the user of the occurrence of a problem with the respective parts is mounted on the jacket 1. In addition, the warning device 7 may inform the user of an abnormal operation of the user. Here, the warning device 7 may be a buzzer or a vibrator. The respective parts and the warning device 7 may be fixed by stitching them in the jacket 1 or by respectively accommodating them in a pocket-like accommodating portion. The inflator 2 includes a carbon dioxide container and a starting device for breaking the sealing of the carbon dioxide container.

Figure 4:
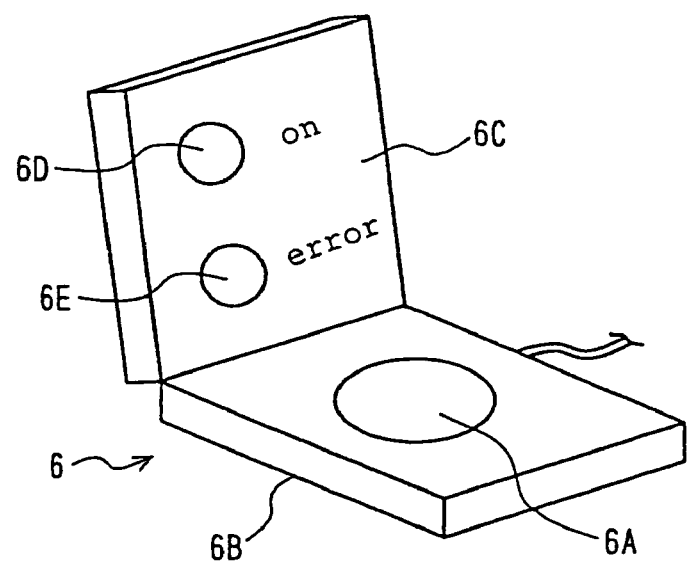
FIG. 4 is an enlarged perspective view of a main switch.

One example of the main switch 6 is shown in FIG. 4. The main switch 6 includes a main body side 6B on which a push button 6A is mounted and a collapsible lid 6C for preventing the push button 6A of the main body side 6B from being erroneously operated. On the lid 6C, an indicator may be mounted which includes a lamp 6D which is illuminated when the switch 6 is turned on and a lamp 6E which displays an error.

Figure 5:
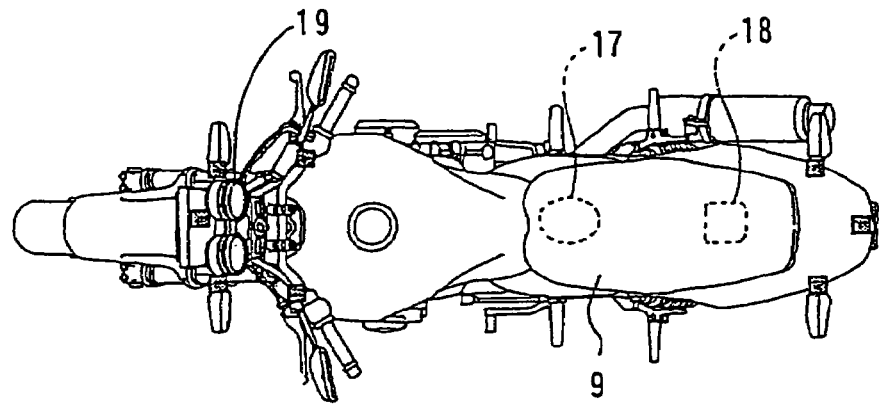
FIG. 5 is an arrangement view of a vehicle-body-side device.

FIG. 5 is an arrangement view of a vehicle-body-side device which constitutes the air bag device together with the jacket which a rider or operator wears. In FIG. 5, a rider-use radio transmitter 17 and a pillion-use radio transmitter 18 are mounted below a seat 9 of a motorcycle 8. On a front portion of the motorcycle 8, preferably on a meter panel or in the periphery of the meter panel, a vehicle body side manipulating portion 19 is mounted. The vehicle-body-side manipulating portion 19 includes an indicator and a vehicle-body-side main switch. An ECU 20 which controls the radio transmitters 17, 18 is mounted on the vehicle body side. Here, the vehicle-body-side main switch may be usually arranged close to the various switches such as a direction indicating switch which is arranged in the vicinity of a grip of a steering handle or the like.

Figure 6:
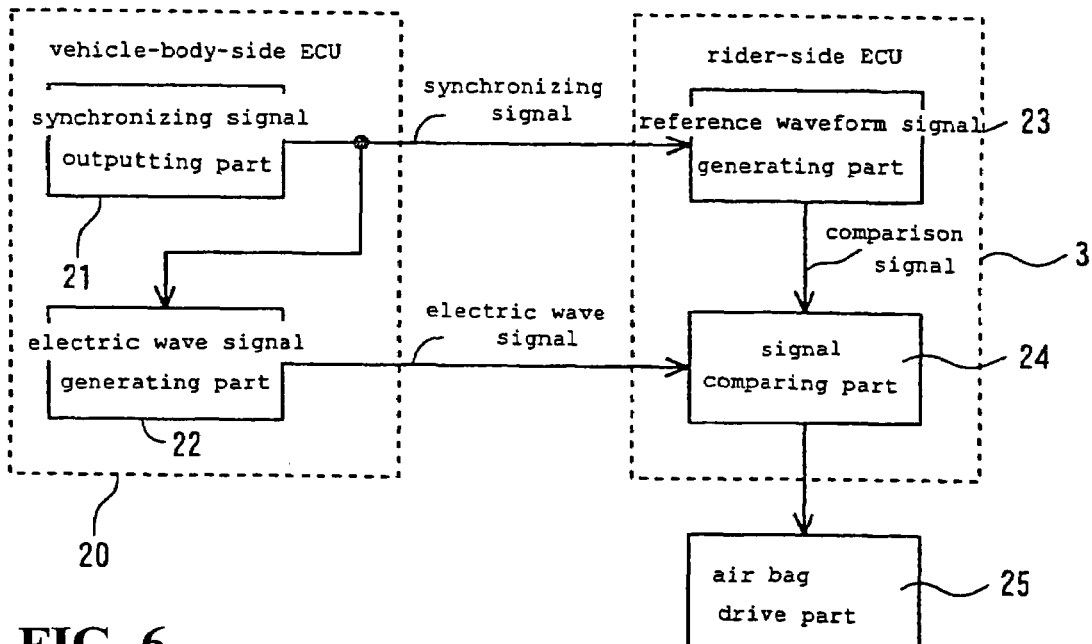
FIG. 6 is a block diagram which shows a function of an essential part of the air bag device.

FIG. 6 is a block diagram which shows the constitution of the air bag device according to this embodiment. Hereinafter, the constitution of a rider-use air bag device is explained. A synchronizing signal outputting part 21 of the vehicle-body-side ECU 20 outputs a pulse signal as a synchronized signal periodically. In response to the synchronized signal, the operation of an electric wave signal generating part 22, which is mounted on the vehicle-body-side ECU 20, and the operation of a reference waveform signal generating part 23, mounted on the rider-side ECU 3, are synchronized with each other.

The electric wave signal generating part 22 generates an electric wave signal of a constant frequency, the reference waveform signal generating part 23 generates a comparison signal of a frequency having a waveform equal to a waveform of the electric wave signal. A signal comparing part 24 compares a phase of the electric wave signal which is received from the electric wave signal generating part 22 with a phase of the comparison signal which is received from the reference waveform signal generating part 23. The electric wave signal generating part 22 and the reference waveform signal generating part 23 are synchronized in response to the synchronized signal. Thus, when a distance between the rider and the vehicle body is constant, the phase of the electric wave signal and the phase of the comparison signal agree with each other. However, when the rider leaves from the vehicle body, the respective phases are shifted from each other. That is, the electric wave signal which is outputted from the vehicle-body-side electric wave signal generating part 22 is delayed from the comparison signal which is outputted from the rider-side reference waveform signal generating part 23. When a delay quantity of the electric wave signal is changed and exceeds a preset value within a predetermined time, that is, when the rider leaves from the vehicle body at a preset speed within the predetermined time, the signal comparing part 24 inputs a removal detection signal into an air bag drive part 25. The air bag drive part 25 allows the inflator to operate in response to the removal detection signal, and allows the air inflating chamber to develop by supplying air into the air inflating chamber which is formed in the jacket 1.

The signal comparing part 24 receives the electric wave signal and the reference signal from the electric wave signal generating part 22 and the reference waveform signal generating part 23 respectively at a predetermined time interval and detects the delay quantity. Further, the signal comparing part 24 determines whether the rider leaves from the vehicle body or not based on a magnitude of a change of the delay quantity. Further, although the removal of the rider is determined based on the removal speed, it is preferable to use the removal distance as the criteria of determination in combination with the removal speed. When the delay quantity is small, even when the removal speed is large, the signal comparing part 24 does not output the removal detection signal.

Figure 7:
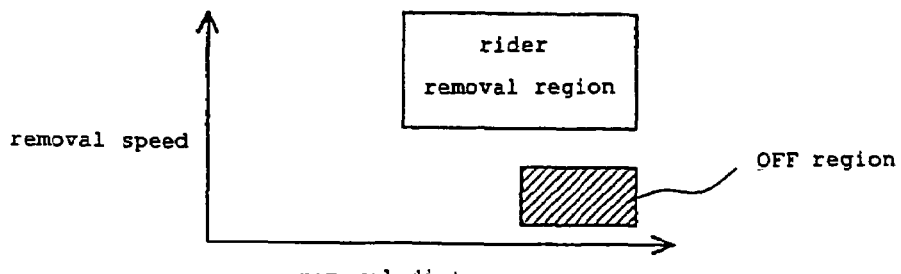
FIG. 7 is a view which shows an example of a removal determination map.

FIG. 7 is a view which shows a removal determination map which uses the removal distance and the removal speed as parameters. As can be understood from FIG. 7, in the rider removal region where both of the removal distance and the removal speed of the rider assume large values, the signal comparing part 24 determines that the rider is removed from the motorcycle 8. On the other hand, when either one of the removal distance and the removal speed assumes a small value, the signal comparing part 24 does not determine the removal of the rider.

To the ECU 3 and the vehicle-body-side ECU 20, failure diagnostic devices of the ECU 3 and the ECU 20 such as a watchdog timer or the like are respectively provided. It is preferable that the failure diagnostic device is configured to alarm a trouble using the indicator or the like of the alarm device 7 and the vehicle-body-side manipulating portion 19 when the failure diagnostic device detects the trouble.

Further, when the removal distance which is detected by the signal comparing part 24 is large and the removal speed which is detected by the signal comparing part 24 is small, the main switch 6 may preferably be automatically turned off. For example, in a region "OFF" of the map in FIG. 7, the main switch 6 may be changed over to an OFF state.

It is preferable to mount the main switch which turns on or off the power source which is supplied from the vehicle-mounted battery not shown in the drawing is provided on the vehicle-body-side ECU 20. However, the power source of the vehicle-body-side ECU 20 may be turned on or off by manipulating the main switch 6 which is mounted on the jacket 1. Accordingly, it is desirable that dedicated radio communication devices are provided to the jacket 1 side and the vehicle body side respectively.

In this embodiment, the case in which the air bag device is incorporated into the jacket, that is, an upper wear, is exemplified. However, the present invention is not limited to such an example and the air bag device may be incorporated into clothing which is suitable for a rider on the motorcycle such as a vest, overalls or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air bag device comprising:
   a radio transmitter mounted on a vehicle body for transmitting an electric wave signal of a predetermined frequency;
   a radio receiver mounted on an operator's clothing for receiving the electric wave signal; and
   a control device mounted on the operator's clothing for detecting a delay quantity or a change in the delay quantity of the electric wave signal which is received by the radio receiver;
   wherein the control device determines a removal of an operator depending on whether the delay quantity or the change of the delay quantity exceeds one of threshold values which correspond to the delay quantity and the change of the delay quantity respectively or not, and operates an air bag mounted on the operator based on the determination.

2. An air bag device according to claim 1, and further including an inflator operatively connected to said air bag for selectively deploying said air bag upon receipt of a signal from the control device.

3. An air bag device according to claim 1, and further including a warning device operatively connected to the operator's clothing for warning of any problems with respect to the air bag device.

4. An air bag device according to claim 3, wherein the warning device is a buzzer or a vibrator.

5. An air bag device according to claim 1, and further including a main switch for activating the control device, said main switch including a cover for preventing the erroneous actuation of the main switch.

6. An air bag device according to claim 1, and further including a synchronizing signal outputting unit for periodically outputting a pulse signal as a synchronized signal to the radio receiver mounted on the operator's clothing.

7. An air bag device comprising:
   an air bag incorporated in an operator clothing; and
   an inflator for supplying a gas to the air bag so as to deploy the air bag;
   wherein the air bag device further comprises:
   a radio receiver for receiving a radio signal of a predetermined frequency transmitted from a vehicle-body-side radio transmitter;
   a means for detecting a delay quantity of a reception phase of the radio signal or a change quantity of the delay quantity;
   a control device for generating an instruction to deploy the air bag when the delay quantity or the change quantity of the delay quantity exceeds one of threshold values which are set corresponding to the delay quantity and the change quantity of the delay quantity respectively; and
   a battery for supplying a power source to the radio devices, the control device and the air bag device.

8. An air bag device according to claim 7, wherein the air bag device further includes a main switch for supplying the power source to the control device.

9. An air bag device according to claim 8, wherein the control device includes a map for setting an operator removal determination region as a function of the delay quantity or the change quantity of the delay quantity, wherein when the delay quantity or the change quantity of the delay quantity falls within a rider removal region, the control device generates an instruction to deploy the air bag.

10. An air bag device according to claim 7, wherein the control device includes a map for setting an operator removal determination region as a function of the delay quantity or the change quantity of the delay quantity, wherein when the delay quantity or the change quantity of the delay quantity falls within a rider removal region, the control device generates an instruction to deploy the air bag.

11. An air bag device according to claim 7, and further including an inflator operatively connected to said air bag for selectively deploying said air bag upon receipt of a signal from the control device.

12. An air bag device according to claim 7, and further including a warning device operatively connected to the operator's clothing for warning of any problems with respect to the air bag device.

13. An air bag device according to claim 12, wherein the warning device is a buzzer or a vibrator.

14. An air bag device according to claim 7, and further including a main switch for activating the control device, said main switch including a cover for preventing the erroneous actuation of the main switch.

15. An air bag device according to claim 7, and further including a synchronizing signal outputting unit for periodically outputting a pulse signal as a synchronized signal to the radio receiver mounted on the operator's clothing.

16. An air bag device comprising:
   a radio transmitter adapted to be mounted on a vehicle body for transmitting an electric wave signal of a predetermined frequency;

a radio receiver adapted to be mounted on an operator's clothing for receiving the electric wave signal; and a control device adapted to be mounted on the operator's clothing for detecting a delay quantity or a change in the delay quantity of the electric wave signal received by the radio receiver, said control device determining a removal of an operator from the vehicle depending on whether the delay quantity or the change of the delay quantity exceeds threshold values which correspond to the delay quantity and the change of the delay quantity respectively or not, for deploying an air bag mounted on the operator based on the determination.

17. An air bag device according to claim 16, and further including an inflator operatively connected to said air bag for selectively deploying said air bag upon receipt of a signal from the control device.

18. An air bag device according to claim 16, and further including a warning device operatively connected to the operator's clothing for warning of any problems with respect to the air bag device.

19. An air bag device according to claim 18, wherein the warning device is a buzzer or a vibrator.

20. An air bag device according to claim 16, and further including a main switch for activating the control device, said main switch including a cover for preventing the erroneous actuation of the main switch.

\* \* \* \* \*